UNITED STATES PATENT OFFICE.

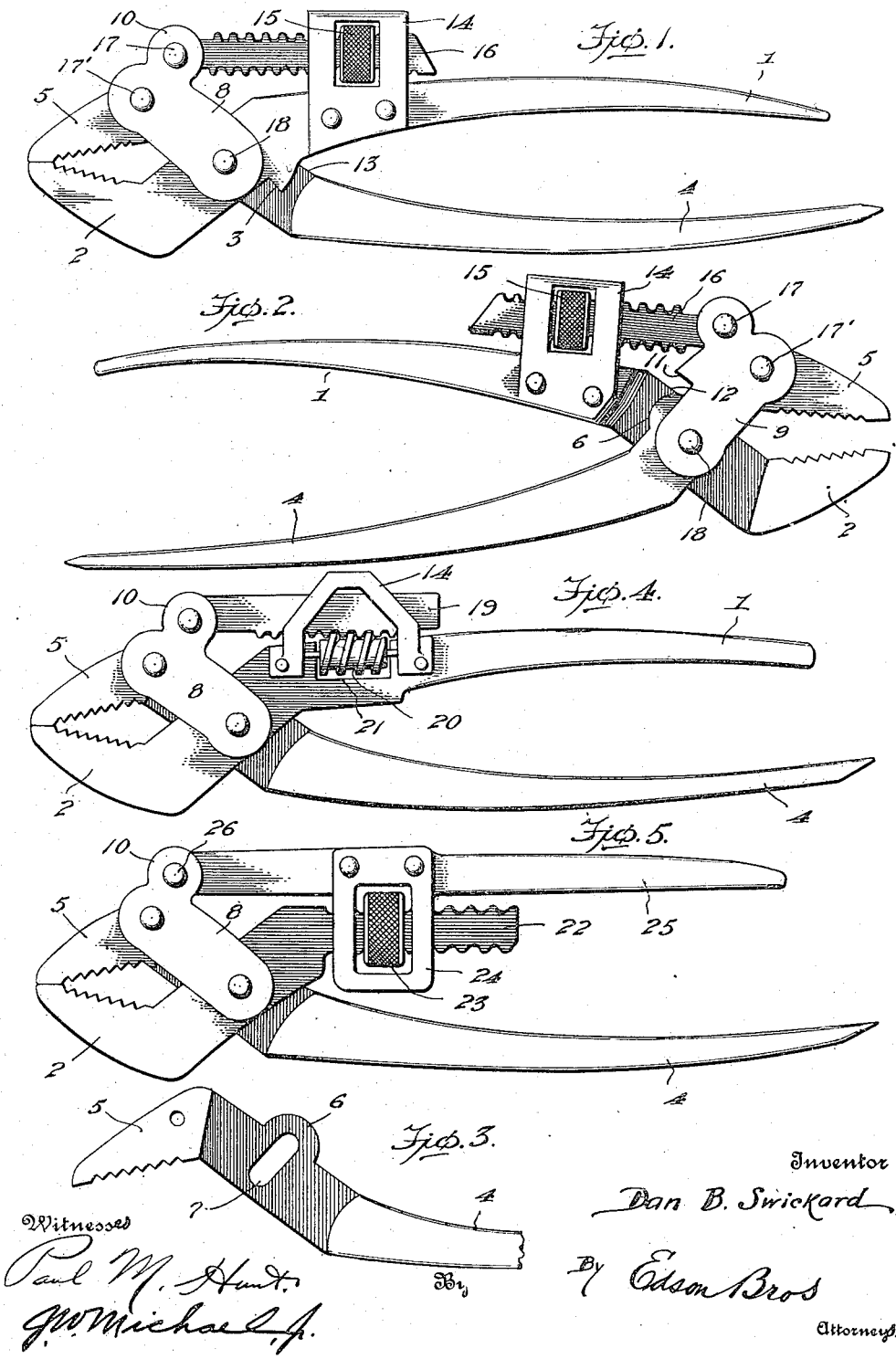

DAN B. SWICKARD, OF GALVA, ILLINOIS.

TOOL.

1,208,694.  Specification of Letters Patent.  Patented Dec. 12, 1916.

Application filed November 22, 1915, Serial No. 62,815. Renewed October 28, 1916. Serial No. 128,347.

*To all whom it may concern:*

Be it known that I, DAN B. SWICKARD, a citizen of the United States, residing at Galva, in the county of Henry and State of Illinois, have invented certain new and useful Improvements in Tools; and I do hereby declare the following to be a full, clear, and exact description of the invention, such as will enable others skilled in the art to which it appertains to make and use the same.

This invention is a tool adapted for use as pliers, or a pipe wrench, or a cutting implement.

In tools of the character described in my pending application, Serial No. 37,203, which was filed June 30, 1915, it has been found that the long sweep of the free handle member permits of too great power to be applied to the material operated upon for some class of work, resulting in the crushing of the material, such for example as a pipe.

This invention is designed to control the action of the pliers by means of a stop device, which, while permitting of increased power over tools of ordinary character, which are permanently pivoted at a predetermined point at the rear of the jaws, prevents injury to the material to be operated upon by the control of the leverage power.

The invention includes means for effecting lateral and endwise adjustment of the jaws by varying the limits of the swinging movement of one lever member with relation to the other lever member, when said members are connected at a plurality of pivotal points.

The tool embodies a plurality of lever members so connected that one member has a swinging movement with relation to the other member and the jaws are adjustable laterally and endwise by mechanism carried by one of the members, associated with means on one of the members to limit the endwise and lateral movements of said member.

This invention is susceptible of many embodiments of construction and the right is reserved to make such changes and alterations as fairly fall within the scope of the appended claims.

In the drawings:—Figure 1 is a side elevation of one form of the device disclosing a type of wire cutter. Fig. 2 is a view of the other side of the device of Fig. 1 except that the wire cutter is disclosed on a link member. Fig. 3 is a side elevation of one member of the device of Fig. 1. Fig. 4 is a side elevation of another embodiment of the device. Fig. 5 is a side elevation of still another embodiment of the device.

The structure illustrated in Figs. 1 and 2 is shown as comprising two members. One member comprises a handle 1, a jaw 2, and a nib 3 formed on one edge thereof. The other member embodies a handle 4 and a jaw 5. This member is shown in Fig. 3, provided with an enlarged portion at the point of crossing of the members 1 and 4, said enlarged portion forming an enlargement 6 to provide for a transversely arranged slot 7.

The structure is shown provided with a plurality of links 8, 9. The link 8 is illustrated in Fig. 1 as provided with an offset 10, the body of the link being shown elongated to extend from the jaw 5 of one member to the rear of the jaw 2 of the other member, to permit the offset 10 to be positioned above the jaw 5. The link 9 is similar in all substantial particulars to the link 8, except that it is provided with a notch 11 on one edge to coöperate with the straight edge 12 of the handle 1 where it is directed angularly to form the section which crosses the angular portion of its opposing handle 4. This notch 11 and angular portion 12 form a cutting edge for severing wire or other materials. In like manner, the nib 3 coöperates with the edge 13 of the handle member 4 to serve as a wire cutter.

In Figs. 1 and 2 the handle member 1 is shown provided with a yoke 14 serving as means to house a threaded thumb nut 15 which is adapted to engage a threaded bar 16. The bar is pivotally connected to the offset 10 as at 17, and has slidable connection with the yoke 14, the nut 15 serving as limiting means for the slidable connection of the bar 16. The links 8 and 9 are pivotally connected with the jaw 5 at substantially the central portion thereof by means of the pivot 17', which extends through the jaw 5 and connects with said links 8 and 9 near one end thereof. Near the opposite ends of the links 8 and 9 there is provided another pivot 18 which passes through an aperture in one member, such as the angular portion of member 1, and through the slot 7 of member 4, thereby securing both links for simultaneous movement with the handle member 1 and permitting limited swinging movement of the handle member 4, the ends of the slot 7 coöperating with the pivot 18 to limit the swinging movement of the handle in the open and closed positions of the tool. This arrangement of the slot coöperating with the pivot 18, as distinguished from the freely movable handle 4, enables the operator to control the leverage action of the device when applied to a structure to be operated upon.

In Fig. 4, the yoke 14 is shown of a slightly different construction to house a rack bar 19 with which coöperates a worm 20 mounted in the recess 21 of the handle member 1. This arrangement places the means for adjusting the jaws 2 and 5 at a convenient position for operation by the thumb of the user, and presents a smooth surface to the top of the bar 19 which obviates the risk of injury to the teeth or threads of the adjusting bar.

In Fig. 5, the member 4 and the jaw 5 are of substantially the same construction as those illustrated in Figs. 1, 2 and 4. Jaw 2, however, is provided with a short handle member 22 terminating in a threaded end adapted to be engaged by the threaded nut 23 mounted upon the yoke 24 depending from a supplemental handle member 25. This member 25 is shown pivotally connected at 26 with the offset 10 of the links 8 and 9.

The operation of the tools of the various embodiments is substantially the same, with varying facilities for controlling the action of the jaws to meet the conditions under which the various tools are designed to be used.

Having thus described my invention, what I claim as new and desire to secure by Letters Patent of the United States, is:—

1. A tool of the class described comprising a pair of members each having a jaw, a pair of links arranged at the sides of the jaw of one member, means to pivot said links to said jaw at the point in advance of the crossing of said members, one of said members being provided with a slot, and means extending through said slot to connect the plurality of said links and said members.

2. A tool of the class described comprising a pair of members each having a jaw, one of said members having a slot arranged transversely thereof near the rear of its jaw, a plurality of elongated links, means to connect one end of the links to one jaw near the central part thereof, means to connect the other end of the links through the slot of one member to permit of limited swinging movement of the member and adjustable means to vary the operative position of the jaw.

3. A tool of the class described comprising a pair of members each including a handle and jaw, one of said members having a slot arranged transversely thereof near the rear of its jaw, a plurality of elongated links having an offset, means to connect one end of the links to one jaw, means to connect the other end of the links through one member and the slot of the other member, and adjustable means pivoted to the offset of the links to vary the operative position of the jaws.

4. A tool of the class described comprising a pair of members each including a handle and jaw, a link provided with a notch intermediate of its ends, means to pivot said link to one member in advance of the crossing of the members, means to pivotally connect said link to the other member at the crossing of said members to have an edge of said crossing member coöperate with the notch of said link at predetermined intervals to serve as a cutter, and means to connect said link to the handle of one member.

5. In a tool of the class described comprising a pair of members each including a handle and a jaw, one of said members having an enlargement and a slot at substantially the point where it crosses the other member, a link provided with a notch intermediate of its ends to coöperate with the enlargement and serve as a cutter, means to pivotally connect said link to the jaw of one member, and pivotal means passing through said slot to connect said link with the members at the crossing thereof.

In testimony whereof, I affix my signature, in presence of two witnesses.

DAN B. SWICKARD.

Witnesses:
 DYER FORD,
 G. E. GLIDDEN.

Copies of this patent may be obtained for five cents each, by addressing the "Commissioner of Patents, Washington, D. C."